United States Patent [19]

Beck et al.

[11] Patent Number: 4,689,191

[45] Date of Patent: Aug. 25, 1987

[54] METHOD FOR SETTING THE ENDS OF HOLLOW FIBER BUNDLES

[75] Inventors: Bernd A. W. Beck, Hechingen-Stein; Kurt Spranger, Ammerbuch-Entringen, both of Fed. Rep. of Germany

[73] Assignee: Gambro Dialysatoren KG, Fed. Rep. of Germany

[21] Appl. No.: 739,206

[22] Filed: May 30, 1985

[30] Foreign Application Priority Data

Jun. 18, 1984 [SE] Sweden ............................. 8403247

[51] Int. Cl.⁴ ........................ B29C 39/10; B29D 23/00
[52] U.S. Cl. ................................... 264/573; 264/138; 264/261; 264/263; 264/277; 264/311
[58] Field of Search ............... 264/311, 573, DIG. 75, 264/40.7, 261, 277, 36, 138, 139, 163, 263, 572, 39, 40.3; 156/296; 29/527.3

[56] References Cited

U.S. PATENT DOCUMENTS

| | | | |
|---|---|---|---|
| 3,442,002 | 5/1969 | Geary, Jr. et al. | 264/311 X |
| 4,105,731 | 8/1978 | Yamazaki | 264/573 |
| 4,220,489 | 9/1980 | Coplan et al. | 264/261 X |
| 4,227,295 | 10/1980 | Bodnar et al. | 264/311 X |
| 4,389,363 | 6/1983 | Molthop | 264/263 X |

FOREIGN PATENT DOCUMENTS 2456493 8/1975 Fed. Rep. of Germany.

OTHER PUBLICATIONS

European Search Report, Application No. 165478.

*Primary Examiner*—Jeffery Thurlow
*Assistant Examiner*—Leo B. Tentoni
*Attorney, Agent, or Firm*—Lerner, David, Littenberg, Krumholz & Mentlik

[57] ABSTRACT

A method for setting the ends of bundles of hollow fibers in an end wall contained within a housing are disclosed, including providing a bundle of hollow fibers having adjacent open end faces, supplying a hardenable liquid material to those end faces so that this material can penetrate between the hollow fibers and into the interiors thereof, and exerting a positive pressure within the housing containing the hollow fibers to control the degree of penetration of the hardenable liquid material both between and within the interior of the hollow fibers.

14 Claims, 5 Drawing Figures

Fig.1
Fig.2
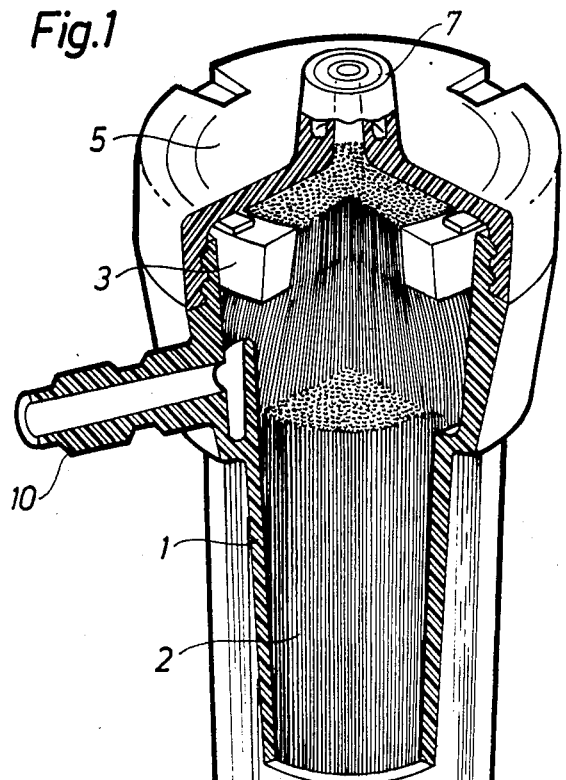
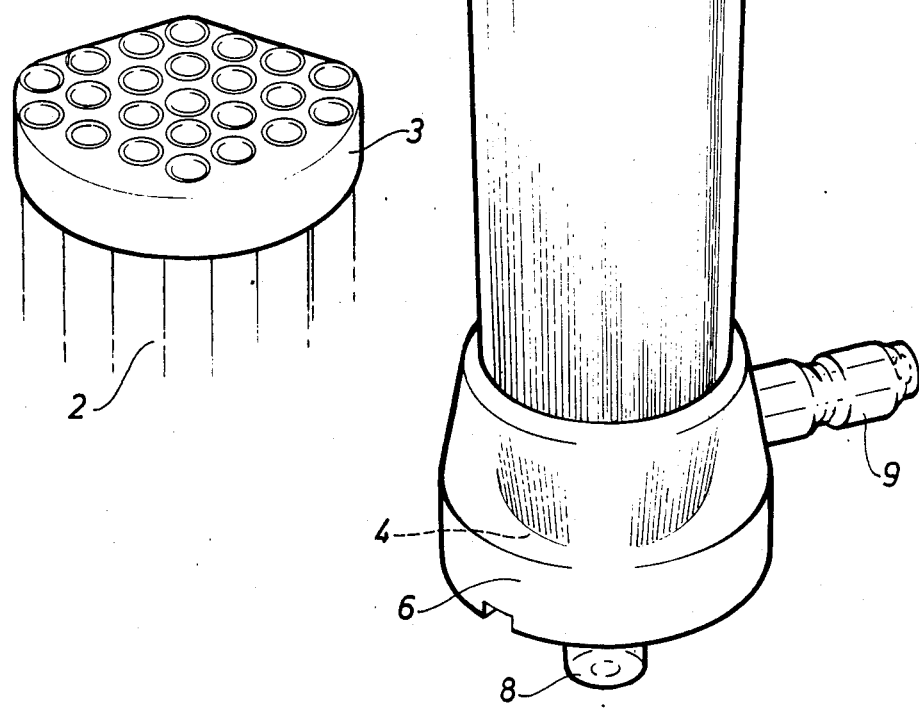

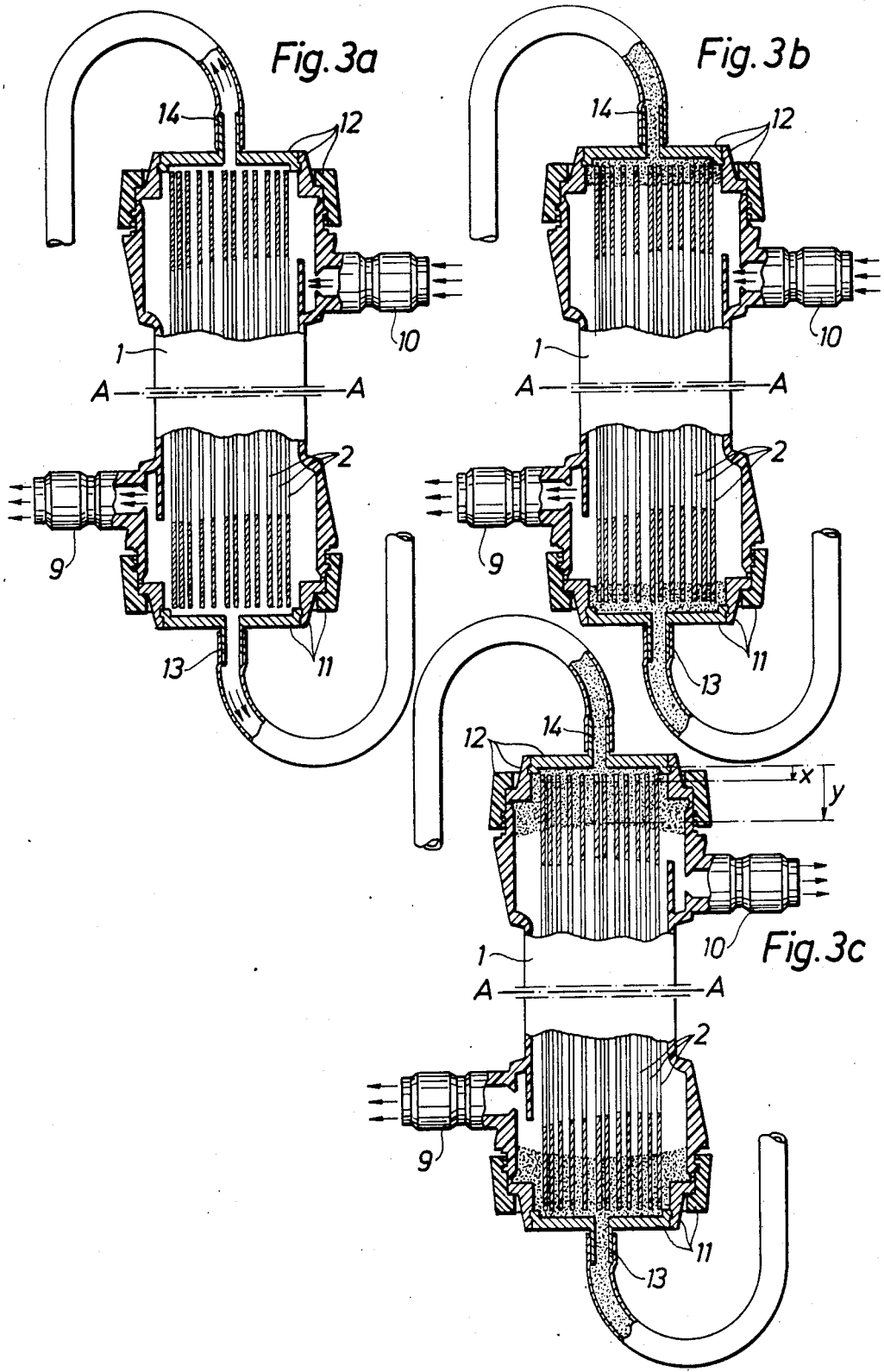

4,689,191

METHOD FOR SETTING THE ENDS OF HOLLOW FIBER BUNDLES

FIELD OF THE INVENTION

The present invention relates to methods for producing devices which include bundles of hollow fibers. More particularly, the present invention relates to methods for producing such devices in which the hollow fibers are contained within a housing and the ends of the hollow fibers are embedded in end wall arranged at opposite ends of the housing. Still more particularly, the present invention relates to methods for producing such devices in which the ends of the hollow fibers are opened for the free flow of liquid through the interior of the fibers.

BACKGROUND OF THE INVENTION

Devices including bundles of hollow fibers of the type described above have been used, for example, for various types of medical treatments, such as hemodialysis, hemofiltration, plasmapheresis, and immunotherapy. In addition, such devices have been used in other fields, such as in the general fields of dialysis and of filtration as in connection with the cleaning of sea water.

In connection with the production of these types of devices, both ends of the housing containing the bundle of fibers therein are normally enclosed in a casting mold, into which the material for the respective end wall is fed in a liquid condition for penetration into and around the fibers. It is necessary to control that penetration in order that the degree of such penetration into the fibers is less than the degree of such penetration around the fibers, thereby making it possible to open the interior of the fibers by making a cut at a location between the planes represented by these two different degrees of penetration.

Such control is obtained in a variety of ways. According to one such known method, the ends of the fibers are first closed by means of a special material, such as by means of a so-called "hot melt". Thus, subsequent to this closing, the end wall is itself cast in a second step.

In an alternative known method, the two end walls are molded at the same time in a manner such that the volume of air which is enclosed within the fibers is compressed, thereby providing an increase in the pressure therein, which in turn thereby prevents further penetration.

In order to further control the degree of penetration of this material in and around the fibers, such methods are often combined with the application of rotational movement around an axis essentially perpendicular to the londitudinal axis of the housing. By the use of such movement, the centrifugal forces thus created influence the depth of penetration both within and around the fibers.

A more detailed description of such centrifugal casting can be found, for example, in U.S. Pat. Nos. 3,339,341; 3,442,002; 3,492,698 and 3,499,062.

Another method for providing uniform penetration by utilizing two liquids in combination with a compressed gas is described in U.S. Pat. Nos. 4,049,765 and 4,105,731. According to this method, a bundle of fibers is dipped into a solidifyable liquid, whose upper surface is controlled by a second liquid, which might in turn be exposed to the pressure of a compressed gas.

In spite of these known control methods, however, it has been difficult, for example, to provide dialysers in a reproduceable way, and within narrow tolerance limits. Furthermore, it has been necessary to permit a relatively great penetration into the fibers, and because of this penetration a relatively large waste of both casting material and fiber material has occurred when the fibers are then opened.

SUMMARY OF THE INVENTION

In accordance with the present invention, these and other objects have now been met by the discovery of a method for setting the end of a bundle of hollow fibers in an end wall contained within a housing having first and second ends, which comprises providing a bundle of hollow fibers having substantially adjacent open end faces at the first end of the housing, supplying a hardenable liquid material to the first end of the housing, whereby the hardenable liquid material can penetrate between the hollow fibers and into the interior of the hollow fibers, and exerting a positive pressure within the housing in order to control the degree of penetration of the hardenable liquid material both between the hollow fibers and into the interior of the hollow fibers.

In accordance with one embodiment of the method of the present invention, the positive pressure is exerted within the housing so as to control the degree of penetration of the hardenable liquid material in a manner such that the hardenable liquid material penetrates a lesser distance into the interior of the hollow fibers than the distance it penetrates between the hollow fibers. In a preferred embodiment, the method includes removing the ends of the hollow fibers in order to expose the interior thereof by cutting transverse to the bundle of hollow fibers at a location between the degree of penetration of the hardenable liquid material into the interior of the hollow fibers and the degree of penetration into the hardenable liquid material between the hollow fibers.

In accordance with another embodiment of the method of the present invention, the method includes applying a casting mold to the first end of the housing whereby the hardenable liquid material can be supplied to the first end of the housing through the casting mold.

In accordance with another embodiment of the method of the present invention, the bundle of hollow fibers includes substantially adjacent open end faces at both the first and second ends of the housing, and the method includes supplying the hardenable liquid material to both the first and second ends of the housing.

In accordance with another embodiment of the method of the present invention, exerting of the positive pressure within the housing is initiated prior to supplying of the hardenable liquid material to the first end of the housing.

In accordance with a preferred embodiment of the method of the present invention, the method includes rotating the housing about an axis substantially perpendicular to a longitudinal axis extending between the first and second ends of the housing, whereby the degree of penetration of the hardenable liquid material is also controlled by the centrifugal force created by that rotation.

In accordance with another embodiment of the method of the present invention, the method includes reducing the positive pressure exerted within the housing after the hardenable liquid material has been supplied to the first end of the housing.

In another embodiment, the method includes terminating the positive pressure exerted within the housing after the hardenable liquid material has been supplied to the first end of the housing.

In accordance with another embodiment of the method of the present invention, exerting of the positive pressure within the housing comprises supplying a compressed gas, such as air, to the housing, and preferably includes heating the compressed air so supplied to the housing. In a preferred embodiment, the hollow fibers comprise regenerated cellulose, the hardenable liquid material comprises polyurethane, and the compressed air is heated to a temperature of about 50° C.

In accordance with another embodiment of the method of the present invention, the housing includes a pair of side ports extending substantially radially from the housing with respect to the bundle of hollow fibers, and exerting of the positive pressure within the housing is carried out through at least one of those side ports. In one embodiment, exerting of the positive pressure within the housing is carried out in one of the side ports and the other side port or ports are sealed during the exerting of the positive pressure within the housing.

In essence, the present invention provides a means for controlling the respective depth of penetration of the hardenable liquid material by exposing the interior of the housing to a positive pressure. An important advantage gained by utilizing this invention is that when the fibers have been closed at both ends a first pressure is created within the fibers and a second pressure is created outside the fibers which can be controlled independently of that first pressure. As a consequence, a pressure differential can be provided so as to create a certain desired penetration into the fibers and a second desired penetration between the fibers. All of this can be provided in a relatively simple manner, i.e. by providing air or other gas under pressure to both the housing and the casting molds before the liquid material for the end walls is fed into those molds.

The degree of penetration is preferably controlled by a combination of the use of such a positive pressure with centrifugal forces created by rotation around an axis essentially perpendicular to the longitudinal axis of the housing, i.e. by use of the present method in combination with centrifugal casting of the type described in the four above-noted U.S. patents.

Furthermore, in order to hasten the solidifying process, heated air is preferably used for providing the required positive pressure. The use of heated air also reduces the formation of bubbles within the casting material. Formation of bubbles may, for instance, be caused by the subsequent expension of air which has not been heated inside the fibers during the centrifugal rotation.

In connection with the production of dialysers, the fibers which are used are often made of regenerated cellulose, for example, Cuprophan®, which can be embedded in polyurethane. In the production of such dialysers it is suitable to maintain a temperature of about 50° C., which temperature thus facilitates the casting process without damaging the fiber material.

Particularly in connection with the production of dialysers or filters, the positive pressure may be supplied through one or more openings in the side of the housing, which openings are normally arranged between the end walls, and are intended for the supply to or the removal of the dialysis liquid and/or the filtrate therefrom.

The pressure within the housing can then be controlled through one of these side openings, while all other openings are kept entirely closed. However, this procedure appears to have been somewhat difficult to realize in practice. Therefore, the pressure is preferably controlled instead by blowing air through one opening, and by causing the air to flow out freely through the opposite opening. By a suitable combination of a selected blowing pressure and the resistance in the exit opening, the precise desired pressure within the housing can be achieved.

BRIEF DESCRIPTION OF THE DRAWINGS

Referring to the drawings, FIG. 1 is an elevational, side, partially sectional view of a dialyser which can be manufactured by the method of the present invention;

FIG. 2 is an enlarged, elevational, side view of a portion of the end wall of the dialyser of FIG. 1;

FIG. 3a is a side, partially sectional, partially schematic view of a portion of the method of the present invention;

FIG. 3b is a side, partially sectional, partially schematic view of a portion of the method of the present invention; and FIG. 3c is a side, partially sectional, partially schematic view of a portion of the mehtod of the present invention.

DETAILED DESCRIPTION

In view of the fact that the present invention is preferably intended for the production of dialysers and similar such devices, the invention will now be described with specific reference to the production of a dialyser, but it is not intended to be limited thereby.

Referring to the Figures, in which like numerals refer to like portions thereof, FIG. 1 shows a dialyser which can be produced by utilization of a method according to the present invention. This dialyser includes an outer cover or housing 1, with a bundle of fibers 2, arranged therein. The ends of these fibers are embedded in two opposite end walls, 3 and 4. An enlarged segment of end wall 3 is shown in FIG. 2. The dialyser itself also includes two lid-like end covers, 5 and 6, with an inlet 7 and an outlet 8, respectively, for the liquid which is to be dialyzed, such as blood. Furthermore, the housing 1, includes an inlet 9 and an outlet 10, respectively, for the dialysis liquid.

FIGS. 3a–3c are intended to illustrate the production method according to the present invention. In these figures, the housing 1 is therefore shown schematically, together with its inlet 9 and outlet 10, respectively. Within the housing 1, a bundle of fibers 2, is shown. When this bundle of fibers is inserted into the housing, the two ends of the housing are then provided with two casting molds, 11 and 12, respectively, with inlets 13 and 14, respectively, for the casting material to be used. If fibers of regenerated cellulose, for example Cuprophan®, are intended to be embedded, polyurethane is preferably used as the casting material. This material penetrates into the fibers to a depth X, and around the fibers to a depth Y (see FIG. 3c). In order to thus make it possible to open the fibers after the casting has been completed it is necessary that the distance Y is larger than the distance X such that a cut can be made between the surfaces defining these two penetration depths. According to this invention, those two depths are controlled during the casting process by exposing the interior of the housing to a positive pressure. As is shown in FIGS. 3a-3b, this positive pressure is preferably provided by connecting outlet 10, in any suitable manner, to a source of compressed air. In this manner, the compressed air can penetrate both into the fibers and also around the fibers, and it can thereafter flow out through connections 9, 13, and 14. Alternatively, as mention above, these connections may be entirely closed, but this has appeared to be difficult to effectuate in practice. It is thus easier to maintain a suitable pressure in connection with a free flow through the housing.

At the same time that such a suitable pressure is provided, the dialyser is also preferably rotated around axis A—A. Thereafter, as is indicated in FIGS. 3b-3c, inlets 13 and 14 are connected with a source of a casting material (not shown) which is thus influenced by the centrifugal force thus created. This casting material thus closed both ends of the fibers 2, and at the same time it penetrates into the space between the fibers. Due to the increased pressure within the fibers, and also due to the compression provided by the penetration, pentration into the fibers will be restricted. A similar compression is not achieved around or between the fibers. Furthermore, as is shown in FIG. 3c, connection 10 may be released from the source of compressed air in such a way that the pressure will be further reduced around the fibers. As a result, and as is shown in FIG. 3c, the degree of penetration within the fibers will be equal to a distance X, and the degree of penetration outside the fibers will be equal to a distance Y. In view of this control of the pressure both within the fibers and around the fibers, these values can be precisely determined. It is thus possible to conserve both casting material and fiber material, and at the same time the effective membrane surface can be kept within well defined tolerance limits, even in connection with the production of a large number of dialysers.

This method can, for instance, also be used for the production of devices provided with bundles of fibers other than the dialyser shown in FIGS. 1 and 2.

It will be understood that the embodiments described herein are merely exemplary and that a person skilled in the art may make many variations and modifications without departing from the spirit and scope of the invention. All such modifications and variations are inended to be included within the scope of the invention as defined in the appended claims.

What we claim is:

1. A method for setting the end of a bundle of hollow fibers in an end wall contained within a housing having first and second ends, said method comprising providing a bundle of hollow fibers having substantially adjacent open end faces at said first end of said housing, exerting a positive pressure within said housing so as to create an increased pressure within the interior of said hollow fibers, and supplying a hardenable liquid material to said open end faces of said hollow fibers while maintaining said positive pressure within said hollow fibers whereby when said hardenable liquid material closes said open end faces said positive pressure is maintained within said interior of said hollow fibers, and continuing to supply said hardenable liquid material to said first end of said housing whereby the degree of penetration of said hardenable liquid material both between said hollow fibers and into the interior of said hollow fibers can be controlled.

2. The method of claim 1 wherein said positive pressure if exerted within said housing so as to control the degree of penetration of said hardenable liquid material in a manner such that said hardenable liquid material penetrates a lesser distance into the interior of said hollow fibers than the distance it penetrates between said hollow fibers.

3. The method of claim 2 including removing the ends of said hollow fibers after said hardenable liquid material has been supplied to said first end of said housing so as to expose the interior of said hollow fibers by cutting transverse to said bundle of hollow fibers at a location between said degree of penetration of said hardenable liquid material into the interior of said hollow fibers and said degree of penetration of said hardenable liquid material between said hollow fibers.

4. The method of claim 1 including applying a casting mold to said first end of said housing whereby said hardenable liquid material can be supplied to said first end of said housing through said casting mold.

5. The method of claim 1 wherein said bundle of hollow fibers includes substantially adjacent open end faces at both said first and second ends of said housing, and including supplying said hardenable liquid material to both said first and second ends of said housing.

6. The method of claim 1 wherein said exerting of said positive pressure within said housing is initiated prior to said supplying of said hardenable liquid material to said first end of said housing.

7. The method of claim 2 including rotating said housing about an axis substantially perpendicular to a longitudinal axis extending between said first and second ends of said housing, whereby the degree of penetration of said hardenable liquid material is also controlled by the centrifugal force created by said rotation.

8. The method of claim 1 including reducing said positive pressure exerted within said housing after said hardenable liquid material has been supplied to said first end of said housing.

9. The method of claim 1 including terminating said positive pressure exerted within said housing after said hardenable liquid material has been supplied to said first end of said housing.

10. The method of claim 1 wherein said exerting of said positive pressure within said housing comprises supplying compressed air to said housing.

11. The method of claim 10 including heating said compressed air supplied to said housing.

12. The method of claim 11 wherein said hollow fibers comprise regenerated cellulose, said hardenable liquid material comprises polyurethane, and wherein said compressed air is heated to a temperature of about 50° C.

13. The method of claim 1 wherein said housing includes a pair of side ports extending substantially radially from said housing with respect to said bundle of hollow fibers, and wherein said exerting of said positive pressure within said housing is carried out through at least one of said side ports.

14. The method of claim 13 wherein said exerting of said positive pressure within said housing is carried out through one of said side ports, and wherein said other of said side ports is sealed during said exerting of said positive pressure within said housing.

* * * * *